United States Patent [19]
Thelen

[11] Patent Number: 5,211,782
[45] Date of Patent: May 18, 1993

[54] VALVE ASSEMBLY FOR TUBELESS TIRE

[76] Inventor: Donald Thelen, 8018 Alondra Ave., Paramount, Calif. 90723

[21] Appl. No.: 756,333

[22] Filed: Sep. 6, 1991

[51] Int. Cl.$^5$ .......................................... B60C 29/02
[52] U.S. Cl. .................................. 152/427; 152/431; 29/525.1; 137/231; 137/232
[58] Field of Search ............... 152/415, 427, 428, 431, 152/DIG. 11; 29/525.1; 137/231, 232

[56] References Cited

U.S. PATENT DOCUMENTS

| | | | |
|---|---|---|---|
| 666,887 | 1/1901 | Row | 137/232 |
| 1,160,712 | 11/1915 | Henderson | 137/231 |
| 2,962,073 | 11/1960 | Reed | 152/427 |
| 3,280,879 | 10/1966 | Simms | 137/231 |
| 3,510,929 | 5/1970 | Kilmarx | 152/427 |
| 4,281,422 | 8/1981 | Simonelli | 137/232 X |
| 4,411,302 | 10/1983 | Kuypers | 152/DIG. 11 X |
| 4,747,202 | 5/1988 | Beals | 29/525.1 X |

*Primary Examiner*—Michael W. Ball
*Assistant Examiner*—Francis J. Lorin
*Attorney, Agent, or Firm*—William E. Mouzavires

[57] ABSTRACT

A tire valve assembly is provided that includes a valve stem with external threads and a valve core which is placed in an axial passage in the valve stem. The valve stem is installed in a hole provided in a wheel rim using a locknut that secures the stem to the rim. The valve stem in particular has at least one flat surface for applying a hand tool to hold and to prevent the valve stem from rotating while the locknut is tightened.

5 Claims, 2 Drawing Sheets

VALVE ASSEMBLY FOR TUBELESS TIRE

BACKGROUND OF THE INVENTION

The present invention is in the field of valve assemblies for tubeless tires, particularly those used in show cars, although the invention need not be limited thereto.

Automobiles displayed in shows are required to be cleaned and polished. Conventional valve assemblies protrude from the rims of the car wheels and impede cleaning of the rims while also being susceptible to breakage. In addition, the projecting valve stem detracts from the appearance of the wheels.

With respect to racing cars, the destruction of a tire valve stem during a race can result in loss of control over the car and extreme danger to the driver. The valve assembly disclosed in U.S. Pat. No. 4,718,639 is an attempt to eliminate the aforementioned danger. However, the valve of the Sherwood patent U.S. Pat. No. 4,718,639 requires custom installation of the valve stem into a wheel rim. The wheel rim must therefore be customed drilled to provide a close tolerance hole for accepting the valve stem, and the hole must be countersunk to accept the top of the valve stem body. It is therefore necessary that the wheal rim be custom-machined to accept the Sherwood valve body.

In addition, the Sherwood valve body lacks any provision for sealing the valve body to avoid loss of air. Further, when the Sherwood valve body is secured by tightening the nut 22, the valve body tends to rotate with the nut, thus restricting the tightening of the valve body to the wheel rim, thereby making it difficult to achieve a secure fixation of the valve body in the rim.

OBJECTS OF THE PRESENT INVENTION

It is an object of the present invention to provide a novel and improved valve assembly particularly suitable for tubeless tires and which will overcome the drawbacks noted above with respect to the prior art exemplified in Sherwood Patent U.S. Pat. No. 4,718,639.

A further object of the present invention is to provide a novel and improved valve body for an automobile tire which projects only a minimum amount from the surface of the rim and yet may be easily secured to the rim without requiring any special tools.

Another object of the present invention is to provide a novel and improved valve assembly for an automotive tire, the assembly providing an effective seal preventing loss of air from the tire.

SUMMARY OF THE INVENTION

In summary, one preferred embodiment of the present invention includes a valve stem which is received in a predrilled or manufactured hole in the tire rim. The valve stem has a flanged head which engages the surface of the rim at the hole. A threaded bore in the valve stem receives a conventional valve core. The external surface of the valve stem has threads to receive a locknut for securing the stem to the rim. A seal is provided between the locknut and the rim to ensure that loss of air is prevented through the space between the hole in the rim and the valve stem. In the preferred embodiment the seal includes an elastomeric seal in the form of a flanged sleeve received about the valve stem. It is also preferred that a back-up washer be inserted about the valve stem between the elastomeric seal and the locknut. To facilitate securement of the valve stem to the rim, the end of the valve stem opposite the flanged head is provided with opposed lands or flats which may be engaged by a tool to prevent movement of the valve stem while the locknut is being advanced along the valve stem. In addition, a closure in the form of a screw cap, is threaded into the internal threads of the valve stem to protect the internal threads of the valve stem while also providing a finished or enhanced appearance to the valve stem.

DRAWINGS

Other objects and advantages of the present invention will become apparent from the following more detailed description taken in conjunction with drawings in which.

DETAILED DESCRIPTION

Figure 4:
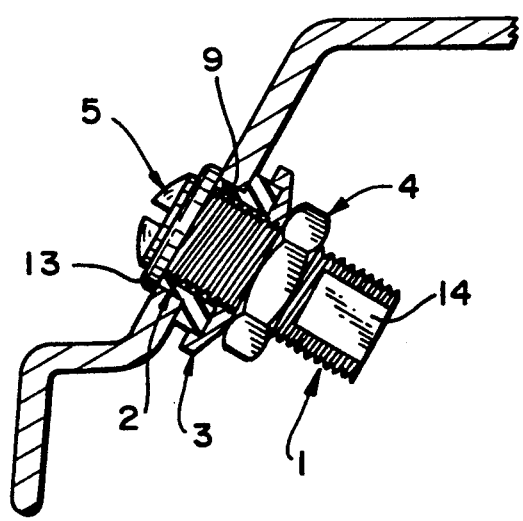
FIG. 4 is a side view of the valve assembly shown installed in a wheel rim, the latter being shown in cross-section.
Figure 2:
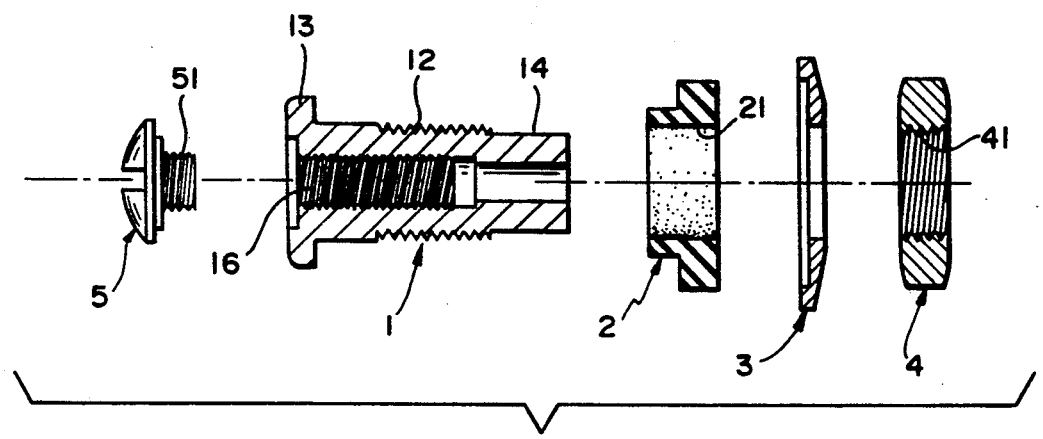
FIG. 2 is a view similar to FIG. 1 except omitting an air applicator shown in FIG. 1.
Figure 5:
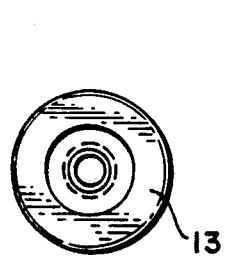
FIG. 5 is a left hand end view of the valve stem shown in FIG. 3.
Figure 3:
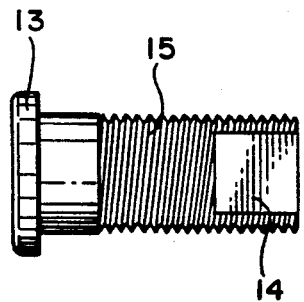
FIG. 3 is a side view of a valve stem included in the valve assembly.
Figure 6:
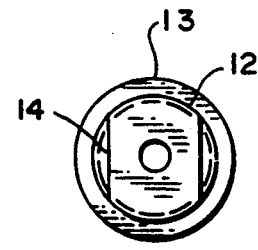
FIG. 6 is a right hand end view of the valve stem shown in FIG. 3.

Referring now to the drawings in detail there is shown for illustrative purposes only; in FIG. 4 a valve assembly constituting a preferred embodiment of the present invention shown installed in a wheel rim having a hole 9 that may be provided in the manufacture of the rim or subsequent thereto. The valve assembly includes a valve stem having a generally cylindrical body 12 dimensioned to be received into hole 9 of the wheel rim. One end of the valve stem 12 has a flanged head 13 adapted to cover the wheel rim hole 9 and engage the surface of the wheel rim as shown in FIG. 4. The valve stem 12 is secured to the wheel rim by means of a locknut 4 having internal threads 41 engageable on threads 15 provided on the external surface of the valve stem between the opposite ends thereof. To facilitate application of the locknut during assembly, the end of the valve stem 12 opposite the flanged head 13 is provided with a plurality of opposed lands or flats 14 which may be engaged by a tool to prevent rotation of the valve stem as the locknut 4 is rotated onto the threads 15 of the valve stem.

In order to insure that loss of air from the tire through the space between the valve stem and the rim does not occur, the valve assembly is provided with a sealing means including in the preferred embodiment an elastomeric seal 2. The elastomeric seal includes a sleeve having a central passage 21 receiving the valve stem and a reduced end portion 22 which is received on and engages with the external surface of the valve stem 12 just below the head 13 so that the sleeve portion 22 engages against and seals the surface of the wheel rim defining the hole 9 with the end of the seal 22 also engaging the under surface of the flanged head 13 as best shown in FIG. 4. In the preferred embodiment, a back-up washer 3 is provided about the valve stem to engage the seal 2 to uniformly distribute the sealing force about the seal 2 to ensure sealing contact is made continuously about the seal 2 and with the flanged head 13 and the wheel rim. Back-up washer 3 may have any suitable construction including a central aperture 31 for receiving the valve stem 12 and a flat end surface 32 for continuous engagement with the surface of the locknut 41.

Any conventional valve core shown at 7 may be employed in the valve stem, however, in the preferred form of the invention, the length of the valve stem 12 is made longer then the length of the valve core 7 to ensure that the valve core 7 is completely enclosed by the valve stem 12 to further protect the valve stem against breakage. The valve core 7 has threads 71 engageable with the internal threads 16 on the valve stem for securing the valve core in the valve stem.

Figure 1:
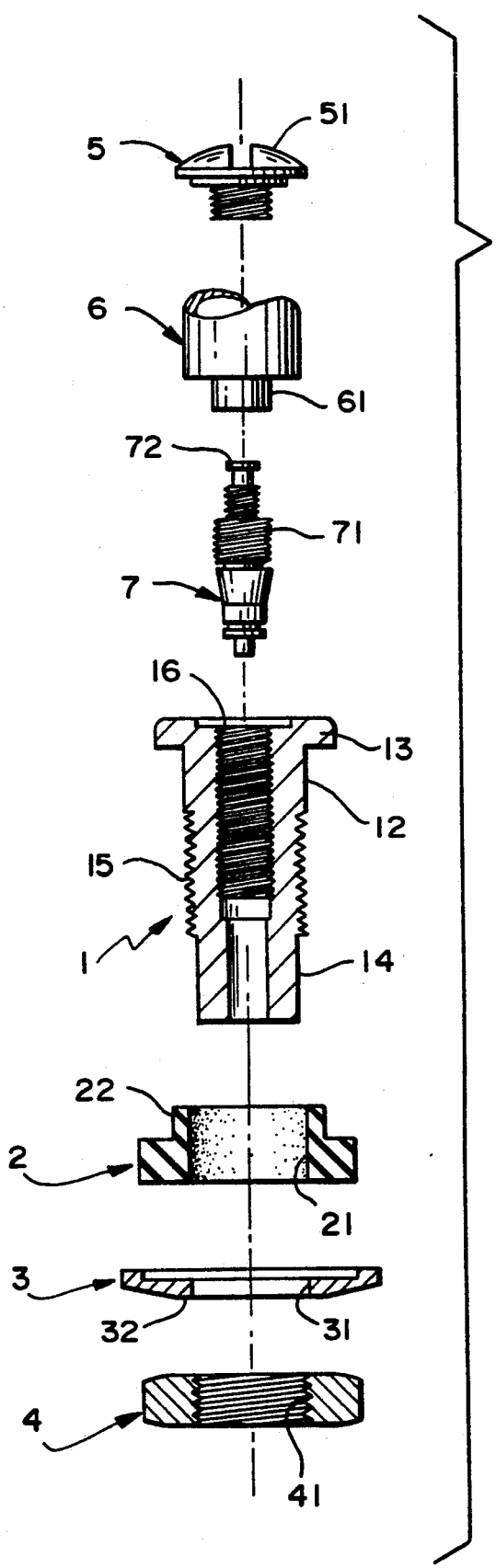
FIG. 1 is an exploded view of the valve assembly constituting a preferred embodiment of the invention.

A conventional air applicator shown at 6 in FIG. 1 may be employed in connection with the valve assembly of the present invention. The air applicator 6 has a head 61 engageable with the head 72 of the valve core 7. After the air applicator is removed and the tire has been filled with the desired amount of air, a closure shown as a screw cap 5 is screwed into the internal threads 16 of the valve stem to protect the threads 16 against damage which could prevent the removal and replacement of the valve core 7. In the preferred embodiment the cap 5 has a low profile head 51 which lies close to the surface of the wheel rim and presents an attractive finished appearance to the valve assembly. At the same time the valve stem is tightly secured to the rim and the valve core 7 is completely enclosed by the valve stem and protected, in contrast to the core in the assembly disclosed in Sherwood patent U.S. Pat. No. 4,718,639. In addition, the seal 2 prevents the loss of air pressure from the tire.

Although the present invention is particularly suitable for wheels used on show cars, it will be obvious that it will have applicability to racing cars and other convention automobiles. Therefore the present invention is not limited to these specific preferred embodiments shown, but rather is defined by the scope of the appended claims as interpreted in accordance with the patent laws of the United States.

What is claimed:

1. A valve assembly for an automotive wheel having a rim, the assembly comprising in combination, a stem dimensioned to be received in a hole in an associated tire rim and having an axial passage for receiving a valve core, a valve core receivable within said valve stem passage, a locknut engagable with the valve stem for securing the stem to the associated rim, a seal located about the valve stem for sealing the space between the valve stem and the associated rim, a closure cap receivable in one end of the passage of the valve stem, a back-up washer located about the valve stem and between the locknut and the seal, and wherein said valve stem has opposed flat surfaces for engagement by a tool to hold the valve stem while the locknut is installed on the valve stem, and wherein said passage is longer than said valve core such that said valve core is completely enclosed by the valve stem.

2. A tire rim assembly including a rim having an aperture therein, a valve assembly including a valve stem received in the aperture and having a flange on one end portion thereof engagable on a surface of the rim, lock means on the valve stem for securing the valve stem in the rim with the flange engaged against the rim, and means including a seal between the locknut and the flange and engaging the rim for sealing the space between the valve stem and the rim, and wherein said valve stem has on an end opposite the flange a reduced portion including a flat surface for securement by a tool to prevent rotation of the valve stem during securement to the rim by the lock means, and wherein said seal means includes an elastomeric sleeve receivable about the valve stem and having a reduced section receivable in the space between the valve stem and the rim, said reduced section also being engagable with the flange of the valve stem.

3. The valve assembly defined in claim 2 including a valve core receivable in said valve stem, said valve stem having a length greater than the length of the valve core such that the valve core is completely enclosed by the valve stem.

4. The valve assembly defined in claim 2 including a closure receivable in the flanged end of the valve stem, said closure having a low profile head lying close to the surface of the rim.

5. The valve assembly defined in claim 2 wherein said valve stem has interior threads for securing the valve core and wherein there is further including a closure cap having threads receivable in the internal threads of the valve stem.

* * * * *